United States Patent [19]

Talbot

[11] Patent Number: 5,668,657

[45] Date of Patent: Sep. 16, 1997

[54] PLZT BASED ELECTRO-OPTIC PHASED ARRAY OPTICAL SCANNER

[75] Inventor: Pierre J. Talbot, Alder Creek, N.Y.

[73] Assignee: The United States of America as represented by the Secretary of the Air Force, Washington, D.C.

[21] Appl. No.: 596,783

[22] Filed: Feb. 5, 1996

Related U.S. Application Data

[63] Continuation-in-part of Ser. No. 372,094, Jan. 13, 1995, abandoned.

[51] Int. Cl.⁶ .................................................. G02F 1/29
[52] U.S. Cl. .................................... 359/315; 359/323
[58] Field of Search ............................. 359/315, 316, 359/317, 318, 321, 322, 323

[56] References Cited

U.S. PATENT DOCUMENTS

| | | | |
|---|---|---|---|
| 4,115,747 | 9/1978 | Sato et al. | 331/94.5 M |
| 4,243,300 | 1/1981 | Richards et al. | 350/150 |
| 4,557,563 | 12/1985 | Sprague | 350/162.12 |
| 4,636,786 | 1/1987 | Haertling | 340/783 |
| 4,706,094 | 11/1987 | Kubick | 343/754 |
| 4,804,251 | 2/1989 | Jacobs | 350/392 |
| 4,854,669 | 8/1989 | Birnbach et al. | 350/162.12 |
| 4,867,543 | 9/1989 | Bennion et al. | 350/384 |
| 5,093,747 | 3/1992 | Dorschner | 359/316 |
| 5,115,344 | 5/1992 | Jaskie | 359/573 |
| 5,159,456 | 10/1992 | Takanashi et al. | 358/213.13 |

OTHER PUBLICATIONS

P.J. Talbot and Q.W.Song, Design and Simulation of PLZT–Based Electrooptic Phased Array Scanners, Optical Memory and Neural Networks, vol. 3, No. 2, 1994, 7 pages.
Pierre J. Talbot, Design and Stimulation of PLZT–Based Scanning Grating Lobe Optical Array Generators, Optics Communications, 113 1995, 378–384, 7 pages.

*Primary Examiner*—Georgia Y. Epps
*Assistant Examiner*—Dawn-Marie Bey
*Attorney, Agent, or Firm*—William G. Auton; Harold L. Burstyn

[57] ABSTRACT

The unique properties of quadratic lead lanthanum zirconate titanate (PLZT) compositions make feasible the development of phased array optical scanners. Two implementations of integrated PLZT phased array scanners as two-port and three-port devices are presented. The three-port offers a significant reduction in the maximum electrode voltage required to effect a specific scan angle. The maximum electrode voltage of the PLZT phased array scanner is characterized in terms of the resolution of the scanner.

12 Claims, 7 Drawing Sheets

PLZT BASED ELECTRO-OPTIC PHASED ARRAY OPTICAL SCANNER

This application is a continuation-in-part of application Ser. No. 08/372,094, filed 13 Jan. 1995, now abandoned.

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to scanners, and more specifically the invention pertains to a PLZT based electro-optic phased array optical scanner. This technology is related to the U.S. patent application, Ser. No. 08/372,256 filed on 13 Jan. 1995 entitled "HIGH EFFECIENCY POLYCRYSTALLINE PLZT CERAMIC ELECTRO-OPTIC PHASE GRATING WITH ITO ELECTRODES" by Pierre J. Talbot the disclosure of which is incorporated herein by reference.

Optical scanning is the geometric reorientation of an optical beam's pathway. A device that efficiently and conveniently implemented optical scanning would have wide application. In particular, integrated optical scanning devices would offer the opportunity of implementing reconfigurable geometric pathways in free-space optical interconnect architectures. Reconfigurable geometric pathways would allow for the post-packaging alignment of optical interconnects and the implementation of optical interconnect based recovery schemes for VLSI. In addition, bulk devices would have application in space based optical communication systems.

Optical scanners have been implemented using electromechanical, acousto-optic, and electro-optic schemes. Most previous electro-optic implementations of optical scanners have essentially relied upon affecting a variable prism shaped index variation utilizing triangular electrode patterns in bulk material. One reported optical scanner implemented in lithium tantalite relied upon a phased array scheme. The physical structure of the bulk phased array scanner resulted in substantial grating lobe formation which limited the achievable scan angle. The previous prism and phased array schemes all required substantial electro-optic interaction length in order to affect scanning. This requirement is incompatible with the implementation of integrated devices.

Quadratic lead lanthanum zirconate titanate (PLZT) compositions permit the implementation of novel and integrated structures that affect optical scanning and reconfigurable optical array generation based upon phased array schemes. The electro-optic interaction lengths of the phased array based structures allow for integration with VLSI electronics. These PLZT phased array based structures can facilitate the practical implementation of reconfigurable geometric pathways in optical interconnect architectures.

The task of improving phased array optical scanners is alleviated, to some extent, by the systems described in the following U.S. patents, the disclosures of which are incorporated herein by reference:

U.S. Pat. No. 4,115,747 issued to Sato et al;
U.S. Pat. No. 4,243,300 issued to Richards et al;
U.S. Pat. No. 4,636,786 issued to Haertling;
U.S. Pat. No. 4,854,669 issued to Birnbach et al;
U.S. Pat. No. 5,115,344 issued to Jackie; and
U.S. Pat. No. 5,159,456 issued to Takanashi et al;

U.S. Pat. No. 4,115,747 issued to Sato et al is directed to an optical modulator using a controllable diffraction grating. The Sato diffraction grating, corresponding to the Journal of Applied Physics article cited in the disclosure statement, utilizes interdigital electrodes formed on a substrate comprised of an electro-optic material such as lead lanthanum zirconium titanate (PLZT). The preferred embodiment of the Sato diffraction grating, however, includes an opaque substrate formed of lead-zirconate-titanate (PZT) which cannot be used in accordance with this invention because the Sato diffraction grating operates in reflective mode only. In addition, the interdigital electrodes disclosed in the Sato patent are limited to being formed from metals, such as gold, silver and aluminum.

U.S. Pat. No. 4,854,669 issued to Birnbach et al discloses a spatial filter containing a layer of electro-optic material with electrodes placed thereon to form a number of individual addressable concentric annular bands of different radii. Each of the individual bands can be supplied with a variable voltage so as to change the transmissivity of each band or, more generally, the entire transmissivity of the opto-electric layer in continuous fashion from highly transparent to highly opaque. The Birnbach filter is used in conjunction with an optical image processor that modulates and processes real time X-ray images by suppressing or filtering undesired spatial frequencies while passing a desired range or ranges of spatial frequencies. The spatial filter comprises two conductive layers made of indium tin oxide (ITO), an opto-electric layer formed of a single crystal PLZT, and a silver reflective layer backed with three to four microns of copper to prevent oxidation. A modification of the disclosed optical image processor includes a diffraction grating used in combination with a cluster of Birnbach spatial filters stacked three deep at second order points, two deep at first order points, and singularly placed at zero order points to achieve balance processing of the image data provided at the various order points by the diffraction grating.

The Takanashi et al patent, U.S. Pat. No. 5,159,456, is directed to a photo-to-photo transducer. The transducer is a laminated device including a photo conductive layer composed of amorphous silicon which has formed thereon transparent ITO electrodes. The laminated transducer also includes a photo modulation layer composed of either a liquid crystal layer of the scattering type and PLZT or the composite membrane of a macro-molecule and liquid crystal. These two alternative compositions are used instead of the prior art photo modulation layer composed of a monocrystal of lithium niobate whose refractive index varies with electric field due to the electro-optic effect. The Takanashi patent is specifically directed to utilizing a PLZT layer having transparent ITO electrodes in place of the prior photo modulating layer.

U.S. Pat. No. 4,636,786 issued to Haertling discloses an improved electro-optic ceramic display which incorporates transparent interdigital ITO electrodes being disposed on a PLZT substrate. The electrodes are supplied voltage to produce the electro-optic birefringent effect, i.e., a change in the substrates index of refraction as a function of voltage applied to the interdigital electrodes. Haertling utilizes the known relationship that for certain compositions comprising PLTZ materials, the differences in velocities, or indexes of refraction, caused by a change in applied voltage to the ITO electrodes results in a quadratic ceramic material.

Cited herein as relevant background art, U.S. Pat. No. 5,115,344 to Jackie is directed to a tunable diffraction grating composed of rows of an electrically conductive material deposited on a deformable which is transparent to light of numerous wavelengths. The rows of electrically conductive material are connected to a source of voltage which, when applied, causes the electrode rows to be either repelled or attracted relative to each other, thus increasing or decreasing the spacing of the rows and allowing different wavelengths of light to be diffracted.

Finally, U.S. Pat. No. 4,243,300 issued to Richards et al and cited herein as general background art, discloses an electro-optical modulator/antenna which operates in the tunable diffraction grating mode to vary the magnitude of zero diffraction order. The Richards modulator is composed of a thin substrate of lithium niobate which includes at least one set of metallic interdigital electrodes deposited on the lateral surface or just below the lateral surface of the substrate. The Richards patent employs the known result that a variable electric field between adjacent electrodes changes the crystal's index of refraction in accordance with the linear transverse Pockel's effect. The Richards patent teaches that a cooperation between the diffraction grating phenomenon and the Pockel's effect can be employed to eliminate the possibility of arcing between adjacent electrodes as the zero diffraction order is modulated.

SUMMARY OF THE INVENTION

This invention includes optical scanners which utilize the unique properties of quadratic lead lanthanum zirconate titanate (PLZT) compositions to provide a phased array optical scanner. Two implementations of integrated PLZT phased array scanners as two-port and three-port devices are disclosed. The two-port device is the simplest implementation while the three-port devices offer a significant reduction in the maximum electrode voltage required to effect a specific scan angle. The maximum electrode voltage of the PLZT phased array scanner is characterized in terms of the resolution of the scanner. The etched electrodes form a grating in a transparent PLZT aperture such that predetermined control voltages are applied through the electrodes to adjust the electro-optic index profile in the aperture.

It is an object of the invention to provide an electrically switchable phased array scanner.

It is another object of the invention to provide a design for integrated PLZT phased array scanners as two-port and three-port devices.

These objects together with other objects, features and advantages of the invention will become more readily apparent from the following detailed description when taken in conjunction with accompanying drawings wherein like elements are given like references numerals throughout.

DESCRIPTION OF THE DRAWINGS

For a better understanding of the objects and advantages of this invention, reference should now be made to the following specification and to the accompanying drawings in which.

DETAILED DESCRIPTION OF THE PREFERRED EMBODIMENTS

Figure 3:
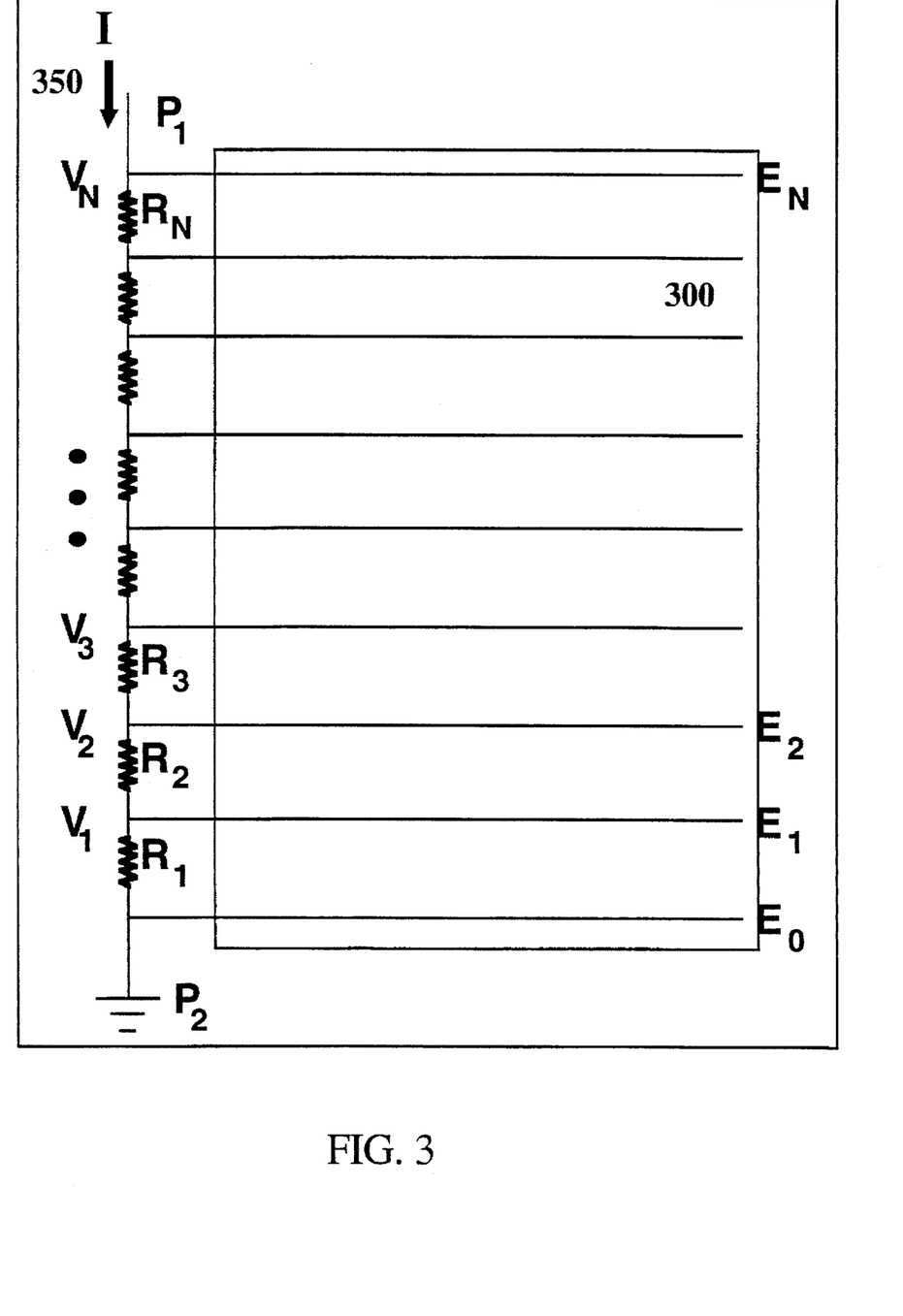
FIG. 3 shows an Electro-optic PZLT phased array scanner implemented as a two port device.
Figure 5:
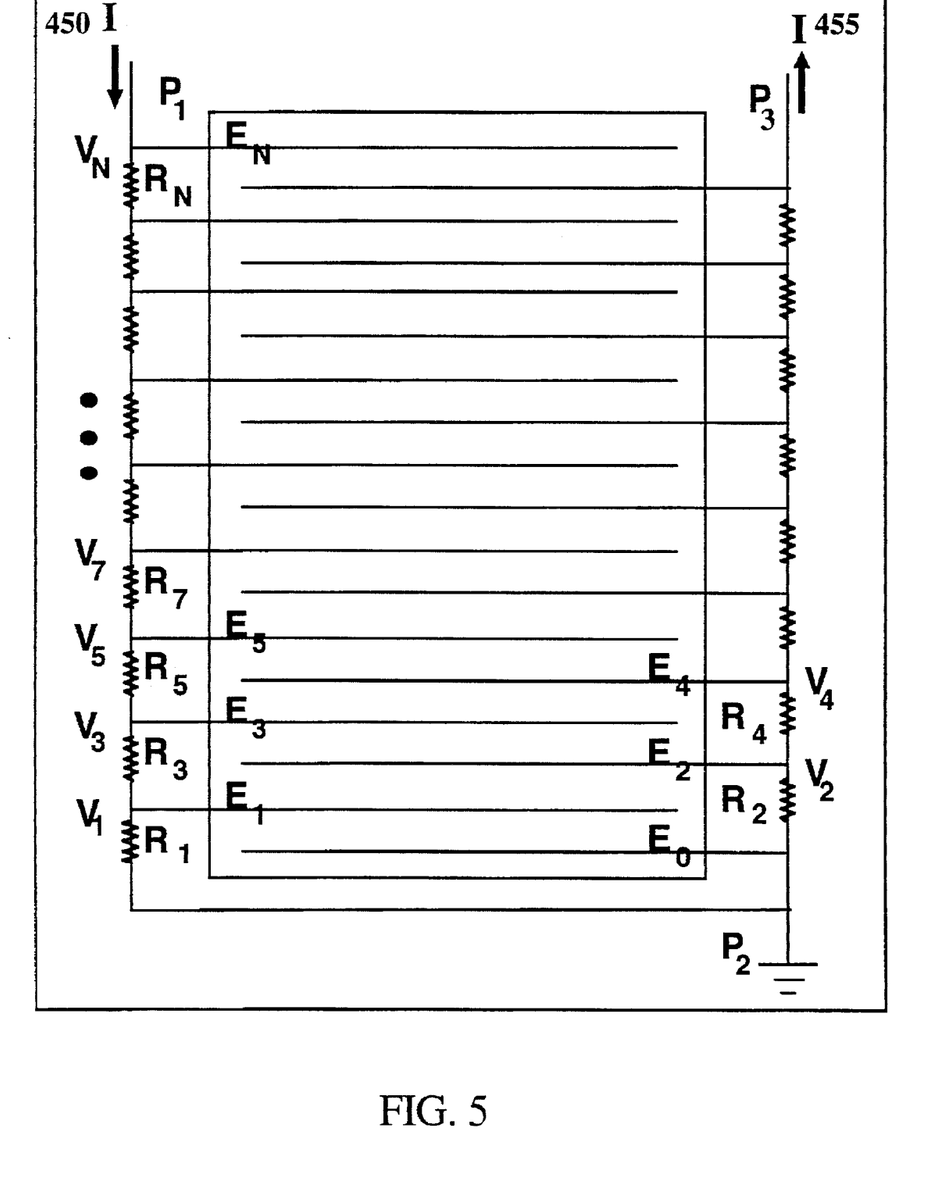
FIG. 5 shows an Electro-optic PLZT phase array scanner implemented as a three port device.

The present invention is the electro-optic phased array scanner of FIGS. 3 and 5. In order to understand the technology involved, the reader's attention is directed to the electro-optic phase grating shown in FIG. 1. This system includes a gold electrode grating embedded in a transparent PLZT substrate which is fabricated in accordance with the design principles described below, and in the above-cited Talbot et al application.

The far field pattern of a phased array optical scanning antenna can be characterized as the product of the far field pattern (element factor) of the radiating element utilized in the array and the far field pattern (array factor) of an array of idealized isotropic sources.

$$E(\theta)=EF(\theta)AF(\theta). \tag{1}$$

If the elements comprising the array can be approximated as isotropic sources, we have $$EF(\theta)=1, \tag{2}$$

and then the far field pattern is essentially characterized by the array factor $$AF(\theta) = \frac{1}{N} \sum_{i=1}^{N} e^{j(i-1)\psi} = \frac{1}{N} \sum_{i=1}^{N} e^{j(i-1)[kd\cos(\theta)+b]}, \tag{3}$$

where $\Psi = kd \cos(\theta)+b$ is the argument of the exponential phasor, $k=2\pi/\lambda$ is the wave number, $(\theta)$ is the scan angle of the array;

b is the phase shift between adjacent array elements;

d is the spacing between array elements, and $\lambda$ is the optical wavelength.

The scan angle affected by the phased array is $$\theta = \cos^{-1}\left(\frac{-b}{kd}\right). \tag{4}$$

The periodic argument in the exponential phasor of the array factor permits multiple maximums in the far field pattern called grating lobes. Grating lobes are suppressed when $$\frac{d}{\lambda} < \frac{1}{1+|\cos(\theta)|}. \tag{5}$$

As the element spacing increases relative to the wavelength the number of grating lobes in the half-hemisphere scan range increases. This multi-peak behavior is usually considered undesirable in scanning applications.

The large electro-optic Kerr coefficients of quadratic PLZT compositions permit the implementation of phased array based electro-optic scanning flats. The scanning flats have significantly reduced electro-optic interaction lengths.

Figure 1:
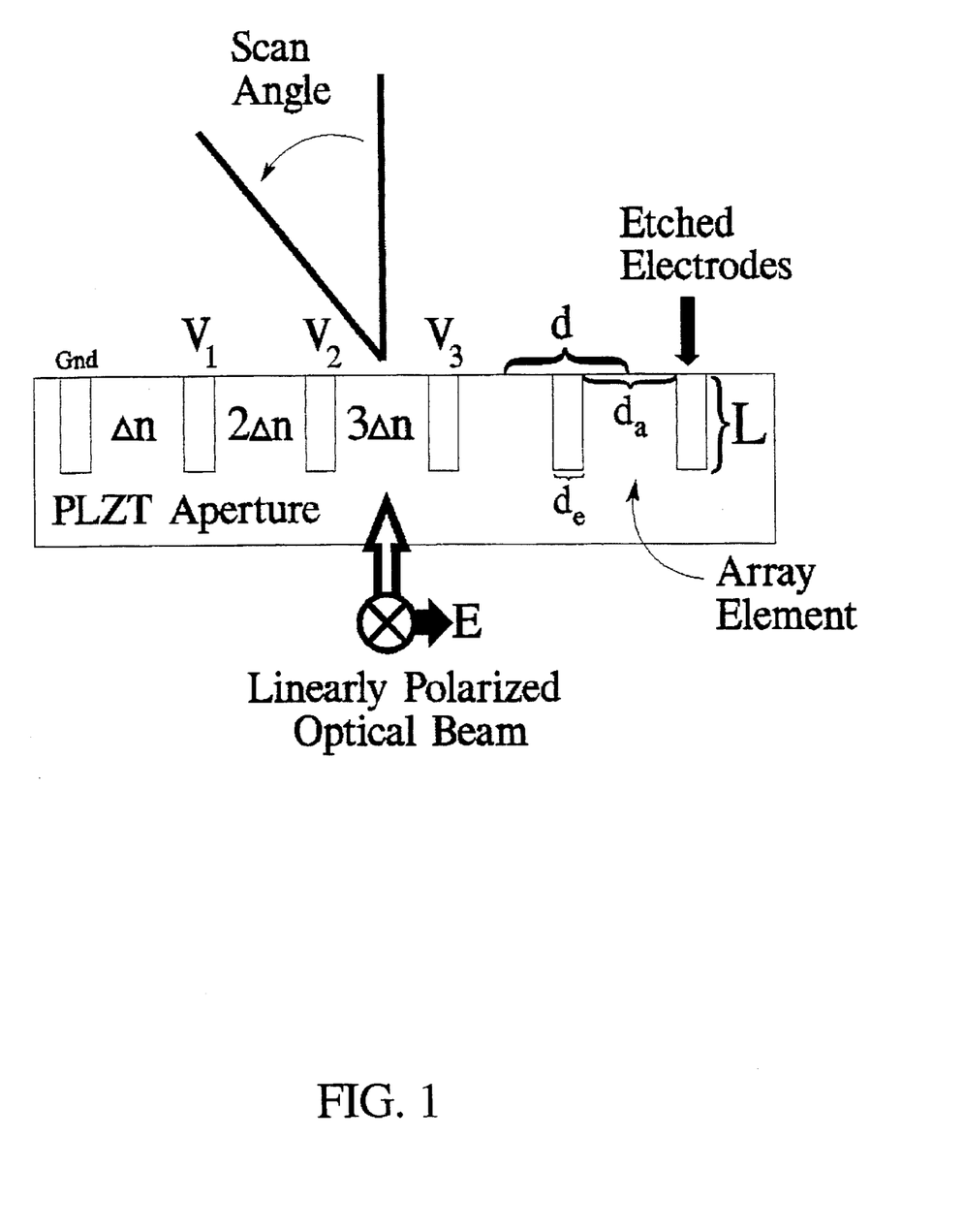
FIG. 1 illustrates an Electro-optic phased array scanner, the dark shaded regions representing etched electrodes.

The structure of the phased array based PLZT scanner consists of a simple etch electrode grating to induce an electro-optic index profile across a transparent PLZT aperture (FIG. 1). Physical design parameters of the scanner include the electrode etch depth L, the electrode aperture size $d_e$, the PLZT array element aperture size $d_a$, the electrode voltage sequence $V_n$, and the number of PLZT array elements N.

The index profile establishes a stepwise linear phase shift across the PLZT aperture. The electro-optic scan phase shift, $b_{EO}$, is a function of the structure's electrode etch depth, the array element aperture, and the electric field intensity between adjacent electrodes.

$$b_{E0} = -\frac{L}{\lambda} \Delta n = -\frac{L}{\lambda}\left[ -\frac{n_0^2}{2} R_{11} E^2 \right] = -\frac{L}{\lambda}\left[ -\frac{n_0^2}{2} R_{11} \frac{v_0^2}{d_a^2} \right], \quad (6)$$

where

L is the etch depth, $\lambda$ is the optical wavelength, $\Delta n$ is the induced index change, $n_0$ is the intrinsic refractive index for PLZT, $R_{11}$ is the quadratic PLZT Kerr coefficient, E is the applied electric field intensity;

$v_0$ is an applied voltage design parameter—the scan potential, $d_a$ is the array element aperture size between electrode pairs.

The achievable electro-optic scan angle of the PLZT scanner is then computed as $$\theta_{E0-scan} = \cos^{-1}\left( \frac{-b_{E0}}{kd} \right), \quad (7)$$

where the array element spacing, $d = d_a + d_e$, is the sum of the electrode size and the array element aperture size. Given the electro-optic scan phase shift required for a particular maximum scan angle, the structure's required scan potential is computed as $$v_0 = \sqrt{ -b_{E0} \frac{\lambda}{L} \left[ 2/r_{11} \frac{n_0^2}{d_a^2} \right] } . \quad (8)$$

Referring to FIG. 1, the structure of the phased array based PLZT scanner consists of a simple etch electrode grating to induce an electro-optic index profile across a transparent PLZT aperture (FIG. 1). Physical design parameters of the scanner include the electrode etch depth in accordance with the design parameters cited above.

The potential required between sequential pairs of the electrode grating to induce the stepwise linear electro-optic index profile are given by $$\Delta V_n = \sqrt{n}\ v_0, \quad n = 1,2,3\ldots,N, \quad (9)$$

and the maximum potential required between any pair of electrodes is $$\Delta V_{max} = \sqrt{N}\ v_0. \quad (10)$$

Figure 2:
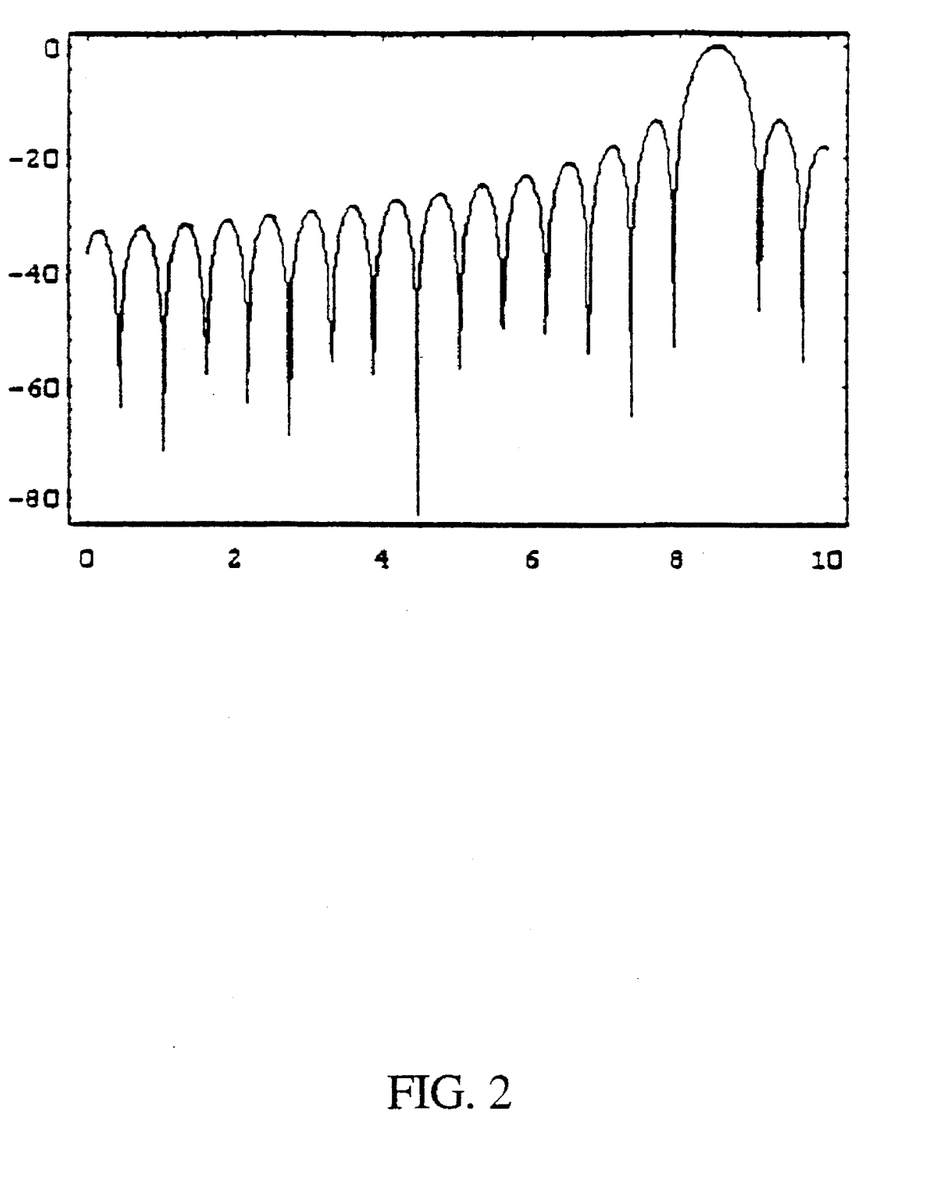
FIG. 2 shows a far field pattern of a PLZT phased array scanner.

The performance of the electro-optic PLZT phased array scanner was simulated. The far field patterns for the scanner were calculated assuming plane wave illumination by a HeNe laser. For simplicity, the idealized approximation to the electrode electric field distribution within the scanner ignored the effect of fringing field between the electrodes. The structural dimensions of the design were restricted to suppress grating lobes. The far field pattern simulation includes the element factor contribution and the effect of finite opaque electrodes. The far field pattern for the PLZT phased array scanner with 100 array elements is illustrated (FIG. 2). The electrode etch depth is one micron. The scan potential EMBED Equation=5 volts. Two design implementations are considered. The maximum array voltage for Implementation II is 27 volts. The maximum scan angle is 8.5 degrees.

The phased array based PLZT electro-optic scanner can be easily implemented as a two port device through the use of a resistive voltage dividing network (FIG. 3).

The two-port electro-optic phased array scanner of FIG. 3 is composed of: a transparent electro-optic aperture 300, a number of parallel electrodes $E_1-E_N$ embedded in the electro-optic aperture 300, a set of input resistors $R_1-R_N$ interconnected in a series circuit between each of the electrodes $E_1-E_N$, and two ports $P_1$ and $P_2$. The first port $P_1$ receives a voltage input signal from a voltage source, 350, and the second port $P_2$ is connected to a common electrical ground. The voltage difference between the two ports allows a continuous scan of optical beam at adjustable scan angles by continuous variation of the current supplied to the voltage divider network. This approach allows adjustable phase steering of the optical beam without the complex multipin approach of other optical scanners. The mathematical principles of the input signal are described below.

The sequential electrode voltages required to establish the stepwise linear refractive index profile can be computed as finite sums $$V_n = v_0 \sum_{i=1}^{n} \sqrt{i}\ , n = 1,2,3\ldots,N. \quad (11)$$

The maximum voltage required to implement the scanner given the scan potential and the array size is $$V_{max} = v_0 \sum_{i=1}^{N} \sqrt{i}\ . \quad (12)$$

Figure 4:
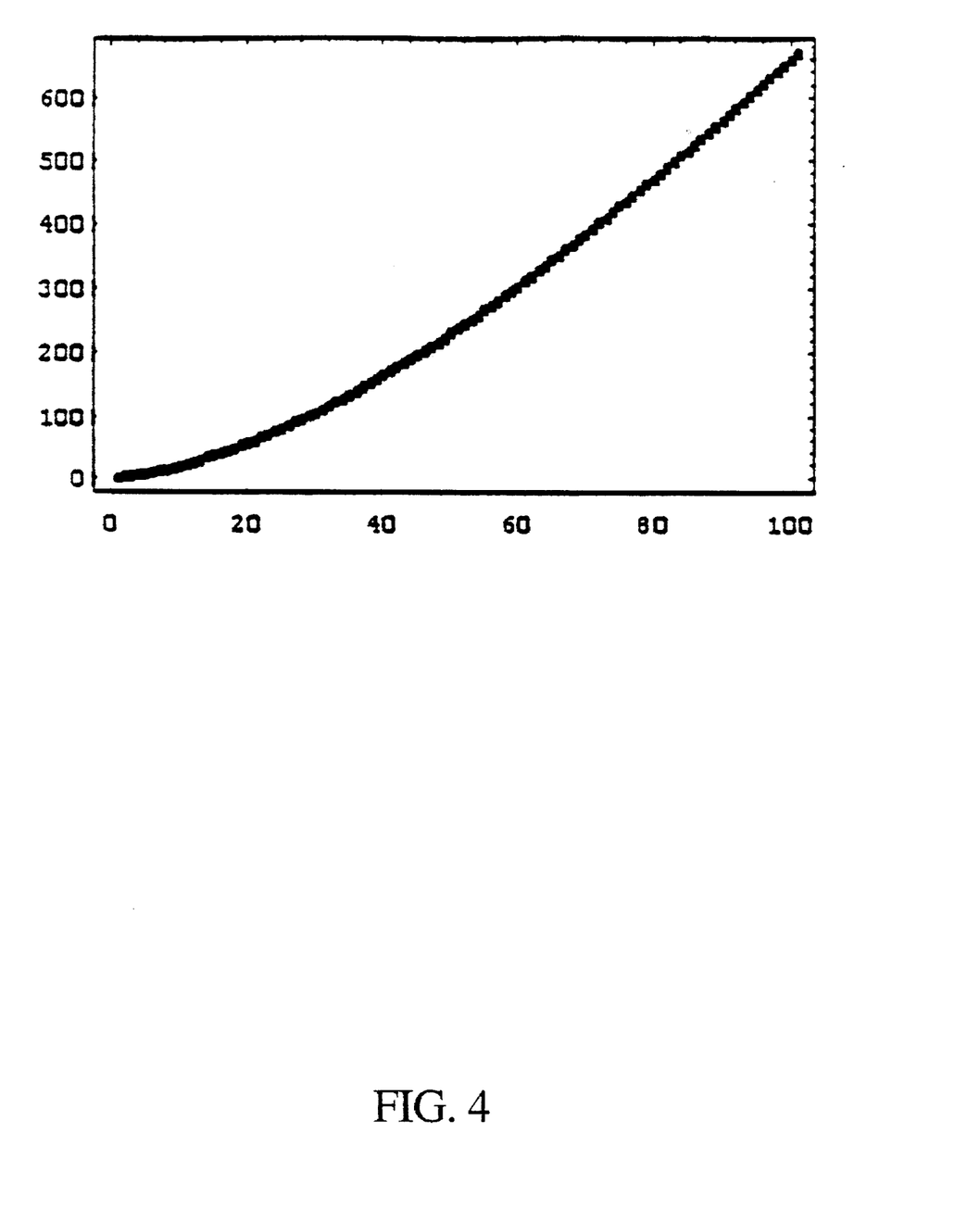
FIG. 4 shows the maximum electrode voltage for a two port device (normalized for Vo as a function of array element number)

The maximum electrode voltage of the PLZT array scanner is illustrated as a function of the array element number (FIG. 4). The potentials across the resistors comprising the voltage dividing network are determined to allow the calculation of the sequence of resistor values for a specific design current $$V_n^{diff} = V_n - V_{n-1}, \quad (13a)$$

$$R_n = \frac{V_n^{diff}}{1} = \frac{\sqrt{n}\ v_0}{1}, \quad n = 1,2,3\ldots,N. \quad (13b)$$

For this implementation, the electro-optic array element potentials applied between pairs of electrodes are the potentials established across the associated resistors in the voltage dividing network $$\Delta V_n = V_n^{diff} = \sqrt{n}\ v_0, \quad n = 1,2,3\ldots,N, \quad (14a)$$

$$\Delta V_{max} = V_N^{diff} = \sqrt{N}\ v_0. \quad (14b)$$

The utilization of the quadratic electro-optic composition (9.5/65/35) of PLZT permits a reduced voltage implementation of the scanner as a three port device (FIG. 5).

The three-port electro-optic phased array scanner of FIG. 5 has many elements in common with the two-port system of FIG. 3. FIG. 5 uses a transparent electro-optic aperture and two sets of parallel electrodes $E_1-E_N$ and $E_2-E_M$ with input resistors $R_1-R_N$ and $R_2-R_M$ connected as shown. The first input port $P_1$ supplies a voltage from a first voltage source 450 to the first set of electrodes. The second port $P_2$ is connected to a common electrical ground, and the third port $P_3$ provides the input of a second voltage source 455 to the second set of electrodes.

All of the electrodes in FIGS. 3 and 5 are composed of transparent indium tin oxide and they divide the PLZT wafer 300 up into panels that act as optical phase steering elements in response to the input voltages of the voltage sources 450 and 455 described below.

The quadratic nature of the electro-optic effect causes the induced index change to be independent of the polarity of the applied array element potentials. The utilization of two resistive voltage dividing networks permits the implementation of a sequence of array element potentials of alternating polarity. The resulting electrode voltages can be computed as finite sums $$V_n = v_0 \sum_{i=1}^{n} (-1)^{i+1} \sqrt{i}, \quad n = 1, 2, 3 \ldots, N. \quad (15)$$

The second implementation for the scanner results in a significant reduction in the maximum required voltage given a specific scan potential and array size $$V_{max} = \text{Maximum of} \left[ v_0 \sum_{i=1}^{N-1} (-1)^{i+1} \sqrt{i}, v_0 \sum_{i=1}^{N} (-1)^{i+1} \sqrt{i} \right]. \quad (16)$$

Figure 6:
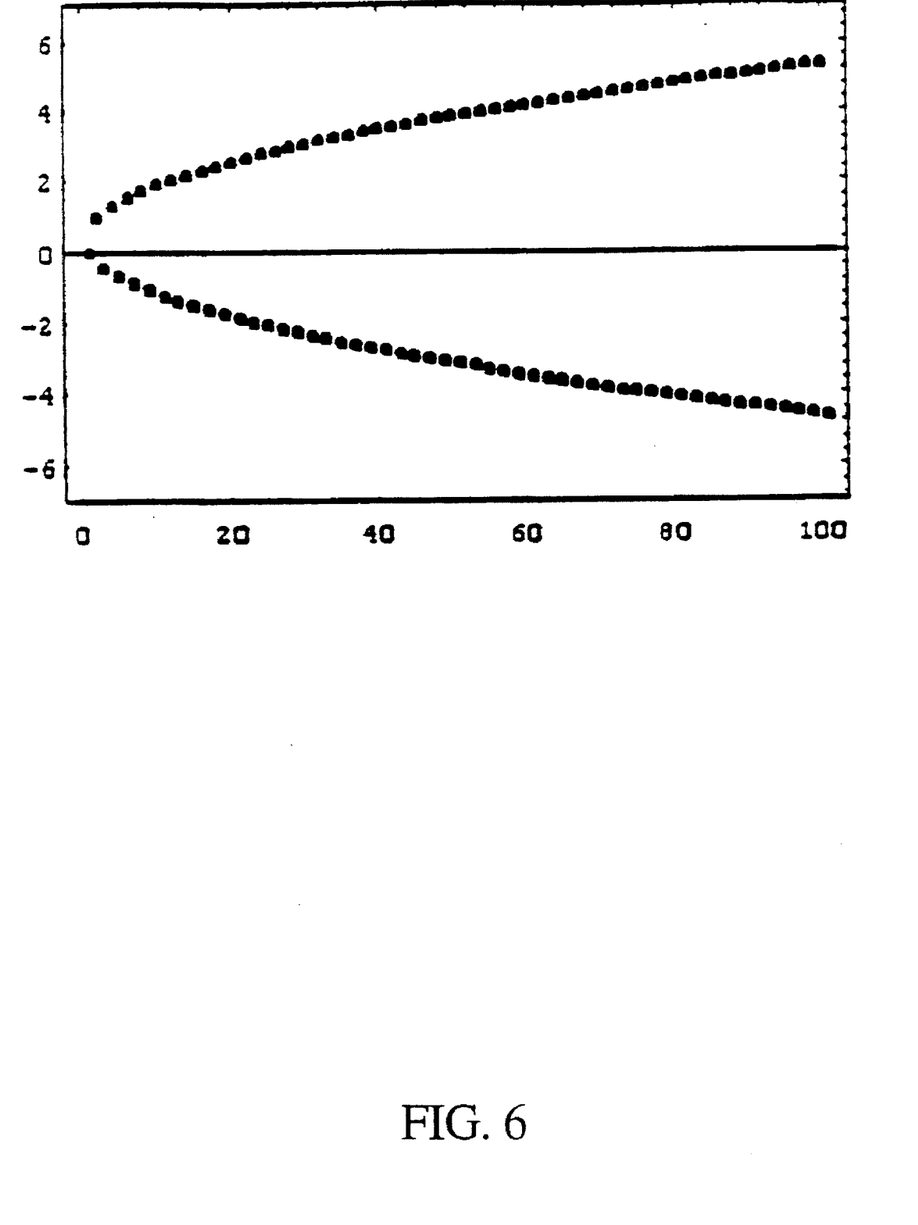
FIG. 6 shows the maximum electrode voltage (normalized for Vo) as a function of array element number.

The maximum electrode voltage of the PLZT phased array scanner is illustrated as a function of the array element number (FIG. 6). As before, the potentials required across the resisters comprising the two voltage dividing networks are determined to allow the calculation of the sequence of resistor values for a specific design current $$V_n^{diff} = [(-1)^n \sqrt{n-1} + (-1)^{n+1} \sqrt{n}] v_o, n = 1, 2, 3 \ldots, N, \quad (17a)$$

$$R_n = \frac{V_n^{diff}}{I} = \frac{[(-1)^n \sqrt{n-1} + (-1)^{n+1} \sqrt{n}] v_o}{I}, \quad (17b)$$

$$n = 1, 2, 3 \ldots, N.$$

For the reduced voltage implementation, the electro-optic array element potentials between electrode pairs does not correspond to the potentials established across the resisters of the two voltage dividing networks $$\Delta V_n \neq V_n^{diff} = [(-1)^n \sqrt{n-1} + (-1)^{n+1} \sqrt{n}] v_o, \quad (18a)$$

$$n = 1, 2, 3 \ldots, N,$$

$$\Delta V_{max} \neq V_N^{diff} = [(-1)^N \sqrt{N-1} + (-1)^{N+1} \sqrt{N}] v_o. \quad (18b)$$

Figure 7:
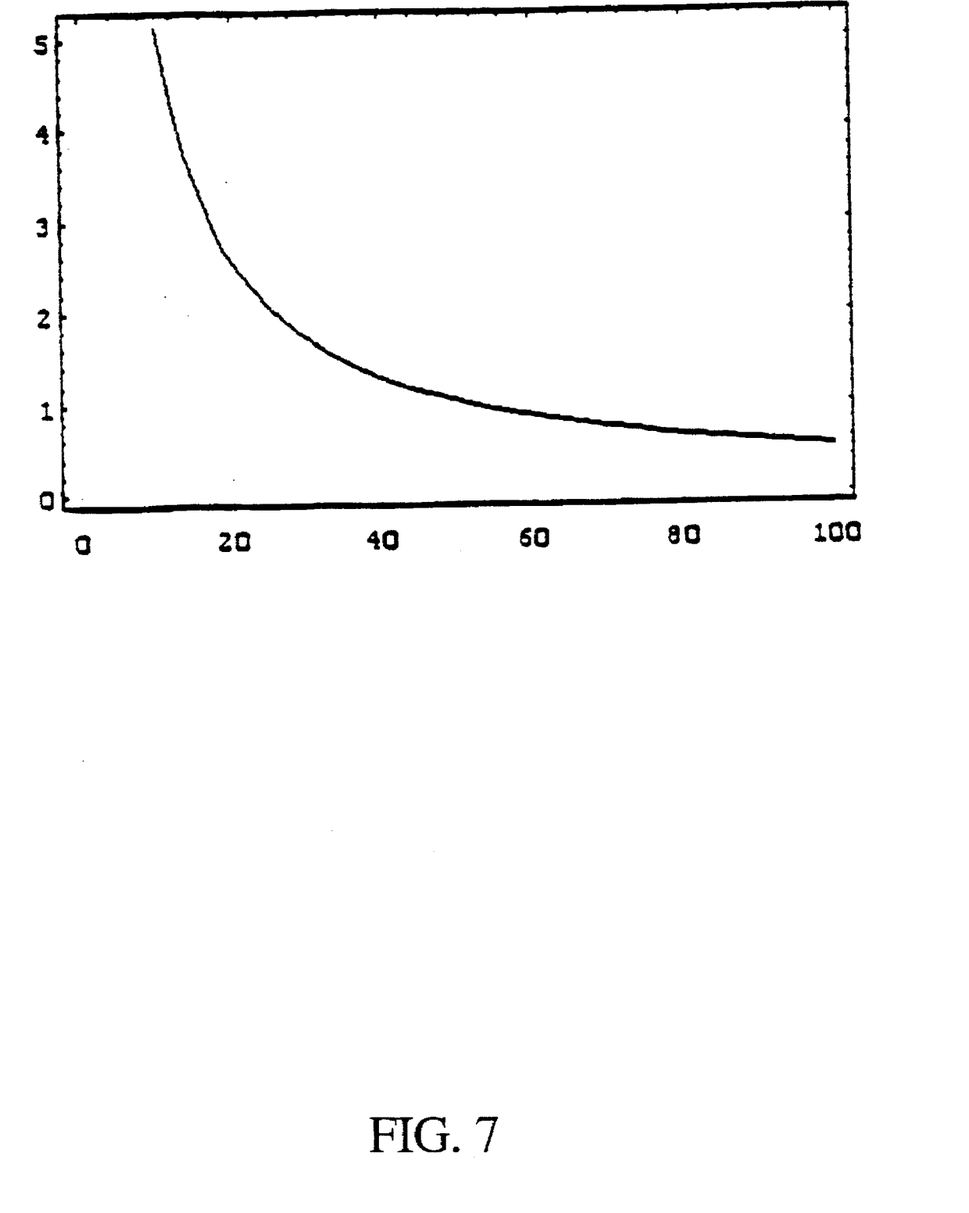
FIG. 7 shows PLZT phased array scanner resolution.

The resolution (spot size) of the electro-optic PLZT phased array scanner can be effectively controlled by specifying the number of elements in the array. A "focusing" or reduction in the spot size can be affected by increasing the number of elements in the array while maintaining all other design parameters of the structure constant. The spot size can be characterized by the half-power beamwidth of the phased array scanning antenna $$\Theta_{hp} \equiv \cos^{-1} \left[ \cos\theta_{EO-scan} - 0.443 \frac{\lambda}{(N+1)d} \right] - \quad (19)$$

$$\cos^{-1} \left[ \cos\theta_{EO-scan} + 0.443 \frac{\lambda}{(N+1)d} \right].$$

The resolution (beamwidth) of the PLZT phased array scanner is illustrated in degrees as a function of array element number (FIG. 7). The improvement in resolution obtained by increasing the number of elements in the array is traded against the increased maximum electrode voltage. The efficiency of the PLZT phased array scanner can be characterized in terms of the array directivity of the array structure.

$$D_{PLZT} = \frac{d_a}{d} D_0 = \frac{d_a}{d} \left[ 2N \frac{d}{\lambda^2} \right] = N \frac{d}{\lambda^2} \quad \text{for } d_a = \frac{d}{2}, \quad (20)$$

where $D_{PLZT}$ is the directivity of the PLZT phase array scanner $D_0$ is the directivity of a standard linear phased array.

The design and simulation of electro-optic PLZT phased array scanners were presented along with two implementation schemes. The fabrication of the scanner implementations is in progress and the experimental characterization of the fabricated structures will be compared to the approximate simulation models. The structural dimensions of the PLZT scanners will challenge the resolution limits of current optical lithography techniques. However, electron beam lithography can easily produce the submicron structural dimensions of the PLZT scanners. In addition, operation in the commercially important near infrared would easily permit optical lithographic patterning of the structures.

The design of PLZT phased array based structures capable of implementing reconfigurable geometric pathways would facilitate the practical development of optical interconnect architectures and optical memory systems.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An electro-optic phased array scanner comprising:

a transparent quadratic electro-optic aperture for processing optical signals;

a plurality of electrodes that form an electrode grating within said transparent electro-optic aperture effective for inducing a grating index of refraction pattern within the transparent electro-optic aperture by applying a controlled current signal to the electrode grating;

a current source that produces a current I and that is connected to the electrode grating;

a set of input resistors interconnected in a circuit between each of the electrodes in the electrode grating to provide a plurality of controlled DC voltage signals to induce said grating index of refraction pattern; and said set of input resistors being defined by $$R_n = \frac{\sqrt{n} \, v_o}{I}, \quad n = 1, 2, 3 \ldots, N,$$

where $R_n$ is the resistance of the nth member of said set of input resistors, and $v_o$ is a controlled DC voltage signal.

2. An electro-optic phase grating as defined in claim 1, wherein said transparent electro-optic aperture comprises a substrate wafer composed of quadratic lead lanthanum zirconate titanate.

3. An electro-optic phased array scanner comprising:

a transparent quadratic electro-optic aperture for processing optical signals;

a plurality of electrodes that form an electrode grating within said transparent electro-optic aperture effective for inducing a grating index of refraction pattern within the transparent aperture by an application of a controlled current signal to the electrode grating;

a current source that produces a current I and that is connected to the electrode grating;

a set of input resistors interconnected in a circuit between each of the electrodes in the electrode grating to provide a plurality of controlled DC voltage signals to induce thereby said grating index of refraction pattern; and said set of input resistors being defined by $$R_n = \frac{[(-1)^n \sqrt{n-1} + (-1)^{n+1} \sqrt{n}] v_o}{I},$$

n=1,2,3 ..., N, where $R_n$ is the resistance of the nth member of said set of input resistors, and $v_o$ is a controlled DC voltage signal.

4. An electro-optic phase grating as defined in claim 3, wherein said transparent electro-optic aperture comprises a substrate wafer composed of quadratic lead lanthanum zirconate titanate.

5. A two-port electro-optic phased array scanner comprising:

a transparent quadratic electro-optic aperture for processing optical signals;

a plurality of electrodes that form an electrode grating within said transparent electro-optic aperture effective for inducing a grating index of refraction pattern within the transparent aperture by applying a controlled DC current signal to the electrode grating;

first and second ports that supply said controlled DC current signal;

a set of input resistors interconnected in a circuit between each of the electrodes in the electrode grating to provide a plurality of controlled DC voltage signals to induce said grating index of refraction pattern; and said set of input resistors being defined by $$R_n = \frac{\sqrt{n} \, v_o}{I}, n = 1,2,3 \ldots, N,$$

where $R_n$ is the resistance of the nth member of said set of input resistors, and $v_o$ is a controlled DC voltage signal.

6. A two-port electro-optic phase grating as defined in claim 5, wherein said transparent electro-optic aperture comprises a substrate wafer composed of quadratic lead lanthanum zirconate titanate.

7. A two-port electro-optic phased array scanner as defined in claim 5, further comprising a controlled current source electrically connected to the first and second ports and supplying a controlled DC voltage signal between a ground electrode and a first member of said electrode grating, said controlled DC voltage signal being defined by:

$$v_o = \sqrt{-b_{EO} \frac{\lambda}{L} \left[ 2/r_{11} \frac{n_o^2}{d_a^2} \right]},$$

where

L is a measure of etch depth, $\lambda$ is a measure of optical wavelength, $n_o$ is a measure of intrinsic refractive index for said quadratic electro-optic aperture, $r_{11}$ is a measure of a Kerr coefficient, $d_a$ is a measure of array element aperture size between electrode pairs, and $b_{EO}$, the phase shift between adjacent array elements, is given by $$-\frac{L}{\lambda} \Delta n = -\frac{L}{\lambda} \left[ \frac{n_o^2}{2} r_{11} E^2 \right] = -\frac{L}{\lambda} \left[ \frac{n_o^2}{2} r_{11} \frac{V_o^2}{d_a^2} \right],$$

where $\Delta n$ is a measure of the induced index change, and

E is a measure of applied electric field intensity.

8. A two-port electro-optic phased array scanner as defined in claim 7, wherein said controlled DC voltage signal can cause a scan angle $\Theta_{EO}$ to vary, said scan angle being given by:

$$\Theta_{EO} = \cos^{-1}\left(\frac{-b_{EO}}{kd}\right), \text{ where}$$

$k = 2\pi/\lambda$ and d=a measure of width of one of said array elements plus an electrode width.

9. A three-port electro-optic phased array scanner comprising:

a transparent quadratic electro-optic aperture for processing optical signals;

a first port that supplies a first controlled DC current signal;

a plurality of electrodes that form an electrode grating effective for inducing a grating index of refraction pattern within the transparent aperture by an application of said first controlled DC current signal from said first port to the electrode grating;

a second port that supplies a second controlled DC current signal;

at least one current source connected to the electrode grating;

a set of input resistors interconnected in a circuit between each of the electrodes in the electrode grating to provide a plurality of controlled DC voltage signals to induce said grating index of refraction pattern;

a third port which connects the electrode grating to an electrical ground; and said set of input resistors being defined by $$R_n = \frac{[(-1)^n \sqrt{n-1} + (-1)^{n+1} \sqrt{n}] v_o}{I},$$

n=1,2,3 ..., N, where $R_n$ is the resistance of the nth member of said set of input resistors, and $v_o$ is a controlled DC voltage signal.

10. A three-port electro-optic phase grating as defined in claim 9, wherein said transparent electro-optic aperture comprises a substrate wafer composed of quadratic lead lanthanum zirconate titanate.

11. A three-port electro-optic phased array scanner as defined in claim 9, further comprising a controlled current source electrically connected to the first, second, and third ports and supplying a controlled DC voltage signal between a ground electrode and a first member of said electrode grating, said controlled DC voltage signal being defined by:

$$v_o = \sqrt{-b_{EO} \frac{\lambda}{L} \left[ 2/r_{11} \frac{n_o^2}{d_a^2} \right]}$$

where

L is a measure of etch depth, $\lambda$ is a measure of optical wavelength, $n_o$ is a measure of intrinsic refractive index for said quadratic electro-optic aperture, $r_{11}$ is a measure of a Kerr coefficient, $d_a$ is a measure of array element aperture size between electrode pairs, and $b_{EO}$, the phase shift between adjacent array elements, is $$-\frac{L}{\lambda} \Delta n = -\frac{L}{\lambda} \left[ -\frac{n_o^2}{2} r_{11} E^2 \right] = -\frac{L}{\lambda} \left[ -\frac{n_o^2}{2} r_{11} \frac{V_o^2}{d_a^2} \right],$$

where $\Delta n$ is a measure of the induced index change, and

E is a measure of applied electric field intensity.

12. A three-port electro-optic phased array scanner as defined in claim 11, wherein said controlled DC voltage signal can cause a scan angle $\Theta_{EO}$ to vary, said scan angle being given by:

$$\Theta_{EO} = \cos^{-1}\left( \frac{-b_{EO}}{kd} \right), \text{ where}$$

$k = 2\pi/\lambda$ and d=a measure of width of one of said array elements plus an electrode width.

* * * * *